US012491836B2

United States Patent
Söhnchen et al.

(10) Patent No.: US 12,491,836 B2
(45) Date of Patent: Dec. 9, 2025

(54) LOAD-BEARING SEATBELT RETRACTOR AND SEAT STRUCTURE

(71) Applicant: AUTOLIV DEVELOPMENT AB, Vargarda (SE)

(72) Inventors: Arndt Söhnchen, Hamburg (DE); Ronald Jabusch, Elmshorn (DE); Hans-Jörg Langhoff, Bönningstedt (DE); Antto-Christian Glaesser, Hasloh (DE); Alexandru Cirstea, Elmshorn (DE); Jens Ehlers, Horst (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 205 days.

(21) Appl. No.: 18/279,749

(22) PCT Filed: Feb. 24, 2022

(86) PCT No.: PCT/EP2022/054600
§ 371 (c)(1),
(2) Date: Aug. 31, 2023

(87) PCT Pub. No.: WO2022/184532
PCT Pub. Date: Sep. 9, 2022

(65) Prior Publication Data
US 2024/0308463 A1     Sep. 19, 2024

(30) Foreign Application Priority Data
Mar. 2, 2021    (DE) ..................... 10 2021 105 010.3

(51) Int. Cl.
*B60N 2/68*      (2006.01)
*B60R 22/26*     (2006.01)
(Continued)

(52) U.S. Cl.
CPC .......... *B60R 22/4628* (2013.01); *B60N 2/688* (2013.01); *B60R 2022/3402* (2013.01)

(58) Field of Classification Search
CPC .......... B60N 2/68; B60N 2/688; B60R 22/18; B60R 22/26; B60R 22/34; B60R 22/4628; B60R 2022/3402
(Continued)

(56) References Cited

U.S. PATENT DOCUMENTS

2020/0047710 A1    2/2020    Jabusch et al.
2021/0387593 A1   12/2021   Jabusch et al.
2022/0266792 A1    8/2022    Glaesser et al.

FOREIGN PATENT DOCUMENTS

DE    102018213279 A1      2/2020
DE    102018213282 A1 *   2/2020  ............ B60R 22/26
(Continued)

OTHER PUBLICATIONS

Description translation for WO 2021023538 from Espacenet (Year: 2021).*

*Primary Examiner* — Paul N Dickson
*Assistant Examiner* — Daniel M. Keck
(74) *Attorney, Agent, or Firm* — Dickinson Wrigth PLLC

(57) ABSTRACT

The invention relates to a load-bearing seatbelt retractor for a seat structure of a vehicle seat, the seatbelt retractor having two housing halves between which functional modules of the seatbelt retractor are disposed. One functional module is a belt reel having a winding axis. The two housing halves form two mutually parallel receptacles in the seatbelt retractor, which are oriented perpendicular to the winding axis. Two seat bars can be inserted into the receptacles. The two housing halves are in contact at least on two contact lines above and below the functional modules with respect to an insertion direction of the receptacles. The lower contact line (Continued)

splits open on both sides along the winding axis such that respective intermediate spaces open toward the receptacles are formed.

10 Claims, 2 Drawing Sheets

(51) Int. Cl.
*B60R 22/34* (2006.01)
*B60R 22/46* (2006.01)

(58) Field of Classification Search
USPC .................................................. 280/801.1
See application file for complete search history.

(56) References Cited

FOREIGN PATENT DOCUMENTS

| | | | | |
|---|---|---|---|---|
| DE | 102018219040 | A1 | | 5/2020 |
| DE | 102019205307 | A1 | | 10/2020 |
| DE | 102021105013 | A1 * | 9/2022 | ............. B60N 2/688 |
| WO | 2021023538 | A1 | | 2/2021 |

* cited by examiner

LOAD-BEARING SEATBELT RETRACTOR AND SEAT STRUCTURE

The present invention relates to a load-bearing seatbelt retractor for a seat structure of a vehicle seat having the features of the preamble of claim 1, and to a corresponding seat structure having the features of the preamble of claim 10.

Vehicle seats having integrated safety belt devices are known, for example, in the use as front seats in convertibles, in which at least the seatbelt retractors of the safety belt devices are fastened in the backrests of the vehicle seats. In this case, due to the lack of a load-bearing B-pillar and for reasons relating to access to the rear seats or for reasons relating to distance from the rear vehicle structure, the seatbelt retractors are preferably integrated into the backrests of the vehicle seats, which must therefore also be designed to absorb the tensile forces acting in the case of restraint. The seatbelt retractors themselves are identical in their basic structure to standard seatbelt retractors and are provided only with various additional assemblies provided especially for installation in the backrests, such as a self-aligning inertia sensor.

In its basic design, a vehicle seat has a seat structure consisting of several load-bearing structural parts, which are used to fasten the vehicle seat to the vehicle structure. The seat structure is equipped with springs and cushioning in order to improve sitting comfort and is also used for the fastening of further components, such as various seat adjustment mechanisms, including the associated electric motors and further components, such as heating devices, sensors, displays, headrests and the like.

In modern vehicles with autonomous driving systems, there is an increasing demand for greater adjustability of vehicle seats in various orientations and positions in such a manner that the vehicle occupant can use the freedom obtained by autonomous driving, for example, for more meaningful communication with the other occupants, for extended and more intensive rest phases or even for work, and can orient the vehicle seat accordingly. As a result, the safety belt device and in particular the seatbelt retractor no longer have to be fastened to the vehicle structure as before, but instead to the vehicle seat, as was already the case, for example, with the front seats in convertibles.

A load-bearing structural part for a vehicle seat in which a seatbelt retractor is disposed is known, for example, from DE 10 2018 213 279 A1.

Against this background, the invention is based on the problem of specifying an improved, dimensionally stable and crash-resistant seatbelt retractor for a seat structure.

To solve the problem, a load-bearing seatbelt retractor having the features of claim 1 is proposed. Further preferred developments of the invention can be taken from the dependent claims, the figures and the associated description.

In accordance with the basic idea of the invention, a load-bearing seatbelt retractor for a seat structure of a vehicle seat is proposed according to claim 1, the seatbelt retractor having two housing halves, between which functional modules of the seatbelt retractor are disposed, a functional module being a belt reel with a winding axis. The two housing halves form two mutually parallel receptacles in the seatbelt retractor, which are oriented perpendicular to the winding axis, wherein the two seat bars can be inserted into the receptacles. The two housing halves are in contact at least on two contact lines above and below the functional modules with respect to an insertion direction of the receptacles, the lower contact line being split on both sides along the winding axis such that respective intermediate spaces open toward the receptacles are formed.

In this context, load-bearing means that the seatbelt retractor, in addition to introducing forces from the safety belt to a seat structure, can also absorb and transfer loads from the seat structure itself. The seatbelt retractor is therefore suitable as a load-bearing structural part of a superordinate seat structure.

A functional module of a seatbelt retractor is, in particular, a belt reel with a safety belt that can be wound onto it to form a belt winding. A further functional module is, in particular, a blocking device.

A functional module can further be a reversible seatbelt pretensioner, an irreversible seatbelt pretensioner, a force-limiting device, a sensor device or even a control device. Furthermore, a functional module can be an electric motor which can be provided for various functions in the seatbelt retractor.

The functional modules of the seatbelt retractor disposed between the two housing halves are preferably arranged axially or coaxially and in series with the belt reel. This results in a space-saving design in a narrow elongated installation space, which means the seatbelt retractor can easily be disposed in the backrest a vehicle seat. With respect to the extension of the axis of rotation of the belt reel, the functional modules are disposed behind or in front of the belt reel. The other functional modules next to the belt reel can be disposed in series in relation to the axis of rotation of the belt reel so that they project only slightly beyond the belt winding on the outside, if necessary, and the elongated design of the seatbelt retractor is continued and further extended.

The two housing halves of the seatbelt retractor preferably extend over the entire width of the seatbelt retractor. The housing halves can each at least partially enclose two seat bars, which form the lateral seat structure of a backrest of a vehicle seat on both sides, in the receptacles.

The proposed separation on both sides, forming an intermediate space in each case, enables optimized and uniform force introduction or force guidance. The two housing halves are designed to enclose the seat bars in the area of the receptacles. The housing halves are brought together centrally until they come into contact at the lower contact line. High rigidity of the load-bearing seatbelt retractor can therefore be achieved with low weight.

The open gaps are also advantageous for diverting excess pressure from a pyrotechnic seatbelt pretensioner downward into a seat cushion and from an occupant on the seat, as well as from an occupant in a possible row of seats behind it, in the event of a deployment, for example, in the event of a possible blockage of the pretensioner wheel. Furthermore, an access opening in the housing to the functional modules of the seatbelt retractor disposed therein is created in a simple manner.

In the preferred embodiment, the intermediate spaces each adjoin the receptacle and merge into the receptacle. In this way, in addition to a weight saving due to an advantageous force path, this also allows favorable manufacturability to be achieved.

In accordance with a further development, it is proposed that the two housing halves are in contact with their inner housing sides at the lower contact line. Accordingly, the lower contact line can form a wide contact surface parallel to the winding axis, i.e., the width of the contact line corresponds, at least in sections, to a multiple of the material thickness of the two housing halves.

It is further proposed that a free end of a pyrotechnic pretensioner tube is guided through one of the open intermediate spaces. This allows easy connection of the ignition plug after the seatbelt retractor has been mounted on a seat structure. Furthermore, this allows a longer design of the pyrotechnic pretensioner tube compared to a guide parallel to the winding axis, since this is systematically limited by the seat width. It also allows any excess pressure from the pretensioner tube to be diverted out of the seatbelt retractor and into the vehicle seat in the event of a blockage of the pretensioner and a pressure relief valve provided therein.

In accordance with a further development, it is proposed that a cable for controlling at least one of the functional modules is guided through one of the open intermediate spaces. For example, the cable may have a connector, which may be connected, for example, in the area of a backrest.

In an advantageous embodiment, the upper contact line is overlapped by a headrest holder. The headrest holder is preferably connected to both housing halves and can hold together the seatbelt retractor with the two housing halves and the functional modules and produce an additional contact force of the housing halves in the contact lines through its fastening.

According to a further development, it is proposed that the headrest holder engages in a housing part with at least one lug. By means of the engagement, a pre-assembly or a joining process with a form-fit connection can be achieved, which enables a very lightweight and cost-effective connection.

It is further proposed that the headrest holder is screwed to one of the two housing halves. It is advantageous, for example, if the headrest holder is screwed to only one headrest half and is connected to the other housing part via a form-fit connection. The connection of the two housing halves can therefore be produced quickly and easily.

According to a further development, it is proposed that the two housing halves are symmetrical in their basic shape. The two housing halves can therefore be identical in different manufacturing steps in a sheet metal production process and may differ in terms of punching or beading.

The housing halves are preferably made of a metal sheet, which allows cost-effective manufacture with high strength.

According to the basic idea of the invention, a seat structure with two seat bars aligned parallel to one another is proposed, wherein a load-bearing seatbelt retractor is attached to the seat bars and is fastened to said seat bars A corresponding seat structure can be designed particularly lightweight and dimensionally stable with the integration of the seatbelt retractor.

In a preferred embodiment, two seat bars extending parallel and spaced apart from one another can be inserted into the seatbelt retractor along an insertion axis and can be screwed to the seatbelt retractor. The two housing parts of the seatbelt retractor preferably extend over the entire width of the seatbelt retractor. The housing parts can at least partially surround two seat bars which form the lateral seat structure of a backrest of a vehicle seat on both sides. The two housing parts preferably form two receptacles in the seatbelt retractor into which two seat bars can be inserted.

The invention is explained below using preferred embodiments with reference to the accompanying figures. The following are shown:

FIG. 1 shows a load-bearing seatbelt retractor of a seat structure in a front view;

FIG. 2 shows a load-bearing seatbelt retractor with seat bars in a view from below;

Figures 1, 2:
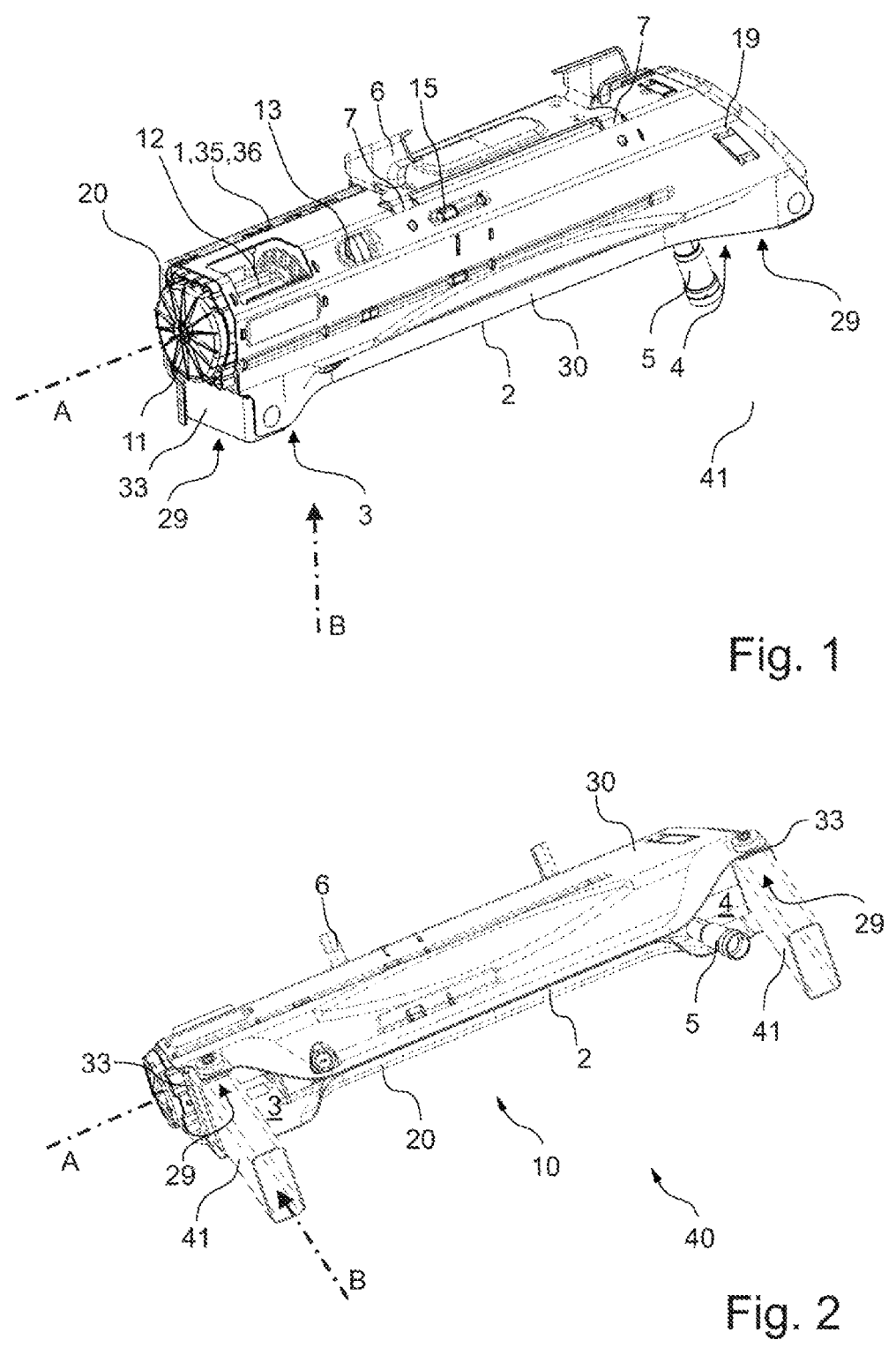
Figure 3:
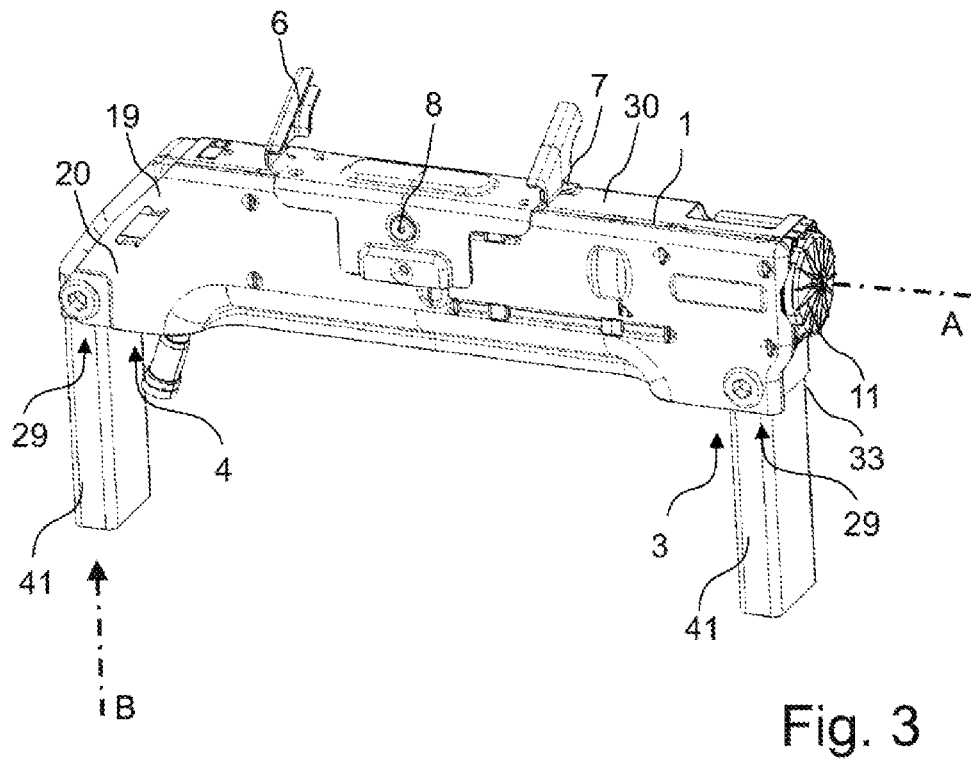
FIG. 3 shows a load-bearing seatbelt retractor with seat bars of a seat structure in a rear view.

FIG. 1 shows an exemplary embodiment of a load-bearing seatbelt retractor 10 in a front view. The seatbelt retractor 10 has a plurality of functional modules 11, 12, 13, 15, 19, which are constructed one behind the other in a stacked arrangement. This results in an elongated installation space which can be integrated into the upper part of a backrest of a vehicle seat. The functional modules 11, 12, 13, 15, 19 are, for example, a belt reel 12 for a safety belt (not shown) on which a drive spring 11 is provided. The belt reel 12 has a winding axis A around which a safety belt can be wound to form a belt winding. Furthermore, a pretensioner drive wheel 13 is provided, with which a pyrotechnic belt tensioning can be achieved. A force-limiting device (LLA) is arranged next to an associated switching device 15. A profile head with blocking pawl is provided axially next to a frame with toothing for blocking the blocking pawl. Furthermore, a transmission, in particular a planetary transmission, on which a motor 19, in particular an electric motor, is provided, can be provided axially, for example. The functional modules 11, 12, 13, 15, 19 are largely concealed by the housing in the illustration.

The housing of the seatbelt retractor 10 consists in principle of two housing halves 20, 30. The seatbelt retractor 10 can be inserted onto the seat bars 41 from above according to the insertion direction B, which is perpendicular to the winding axis A, or the seat bars of the seat structure 40 can be inserted into the receptacles 29 of the seatbelt retractor 10 from below.

The housing halves 20, 30 are connected by form-fit connection at an upper contact line 1 by means of plug-in connections of tongues 35 and corresponding slots 36 at the other housing half 20, 30.

FIG. 2 shows the seatbelt retractor 10 in a view from below, in which the lower contact line 2 between the two housing halves 20, 30 can be seen. The lower contact line 2 opens on both sides along the winding axis A towards the ends of the seatbelt retractor 10. This results in the two open intermediate spaces 3, 4, which widen increasingly starting from the lower contact line 2 until the open intermediate spaces 3, 4 merge into the receptacles 29. In the illustration of FIG. 2, seat bars 41 are inserted into the receptacles 29 in the insertion direction B. The seatbelt retractor 10 is screwed to the seat bars 41 with corresponding through-holes. Accordingly, the seatbelt retractor 10 may form a load-bearing element of the seat structure 40. Furthermore, C-shaped clasps 33 are arranged between the housing inner surfaces of the two housing halves 20, 30 and a seat bar 41 and are screwed together with them. The seat bars 41 fill the receptacles 29 in this case, but the open intermediate spaces 3, 4 remain even with one seat bar 41 inserted in each case. The transition from the lower contact line 2 to the receptacles 29 can be continuous through the open intermediate spaces 3, 4, which reduces mechanical stress peaks and improves the strength.

At the lower contact line 2, the two housing halves 20, 30 are each in contact with their housing inner surfaces or with the corresponding sections of the housing inner surface and thereby form a dimensionally stable composite. The housing halves 20, 30 complement each other in the region of the contact line 2 to form a circumferentially closed profile, on which the functional modules 11, 12, 13, 15, 19 can be fully supported.

FIG. 3 shows the exemplary embodiment of the seatbelt retractor 10 from the rear side, which, in an installed state in a vehicle seat, corresponds to the view on the rear side of the backrest. In this advantageous embodiment, a headrest holder 6 connects the two housing halves 20, 30 and spans the upper contact line 1. The headrest holder 6 has two lugs 7 which are inserted into the housing halves 30. As can be seen in FIG. 3, the further part of the headrest holder 6 surrounds the rear side of the rear housing half 20 and is screwed to this housing half 20 by means of a screw 8.

Figure 4:
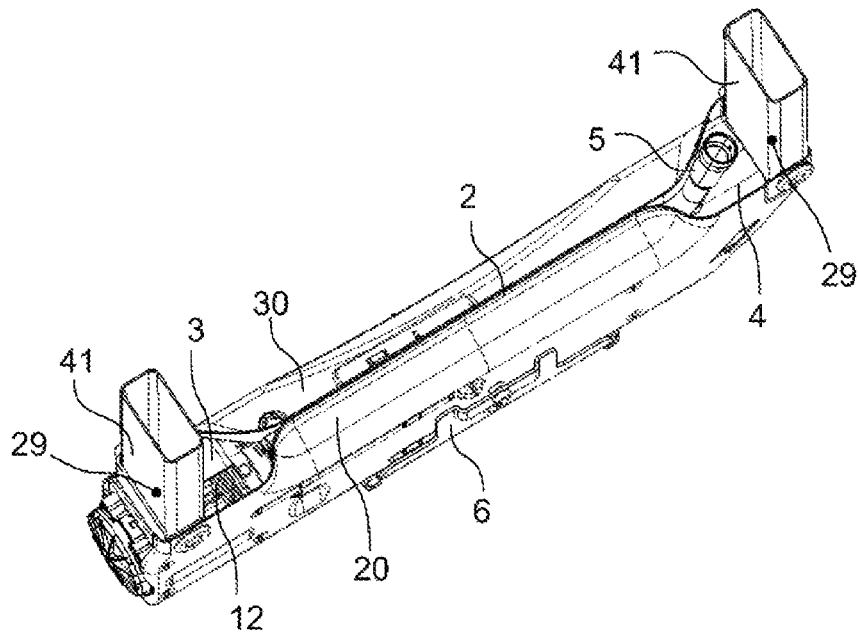
FIG. 4 shows a load-bearing seatbelt retractor with seat bars in a further view from below.

FIG. 4 shows another view of the seatbelt retractor 10 from below. It can be clearly seen here that the pretensioner tube 5 of a pyrotechnic seatbelt pretensioner extends with its free end through the open intermediate space 3, which is located between the lower contact line 2 and the receptacle 29. Accordingly, the pretensioner tube 5 can be designed to be longer than is possible with a straight alignment. Furthermore, an ignition plug can be connected in a simple manner to the free end of the pretensioner tube 5.

In addition to or alternatively instead of the headrest holder 6, further functional connections can also be provided by further mountings. For example, in the case of a seatbelt retractor 10 disposed in the front seats, additional mountings for rear seat entertainment or screen suspension brackets; airbag module mountings and mountings for further airbag components such as gas generators, catch strap pretensioners, etc. can be provided. In the case of seatbelt retractors 10, which are provided for arrangement in rear seats, an attachment for backrest locking can also be provided, for example.

The invention claimed is:

1. A load-bearing seatbelt retractor for a seat structure of a vehicle seat, wherein
the seatbelt retractor has two housing halves, between which are arranged functional modules of the belt retractor, wherein
one functional module is a belt reel with a winding axis, the two housing halves form two mutually parallel receptacles in the seatbelt retractor, which are oriented perpendicular to the winding axis, wherein two seat bars can be inserted into the receptacles,
wherein the two housing halves are in contact at least on two contact lines, one above and one below the functional modules with respect to an insertion direction of the receptacles, wherein
the contact line below the functional modules splits open on both sides along the winding axis such that respective intermediate spaces open toward the receptacles are formed.

2. The seatbelt retractor according to claim 1, wherein the respective intermediate spaces are each adjacent to the receptacle and merge into the receptacle.

3. The seatbelt retractor according to claim 1, wherein the two housing halves are in contact with their housing inner surfaces at the lower contact line.

4. The seatbelt retractor according to claim 1, wherein a free end of a pyrotechnical pretensioner tube is guided through one of the respective intermediate spaces.

5. The seatbelt retractor according to claim 1, wherein a cable for controlling at least one of the functional modules is guided through one of the respective intermediate spaces.

6. The seatbelt retractor according to claim 1, wherein the upper contact line is overlapped by a headrest holder.

7. The seatbelt retractor according to claim 6, wherein the headrest holder engages in a housing half with at least one lug.

8. The seatbelt retractor according to claim 6, wherein the headrest holder is screwed to one of the two housing halves.

9. The seatbelt retractor according to claim 1, wherein the two housing halves are symmetrical in their basic shape.

10. A seat structure having two seat bars aligned parallel to one another, wherein the load-bearing seatbelt retractor recited in claim 1 is attached to the seat bars and fastened to said seat bars.

* * * * *